Nov. 26, 1940. W. S. PEARSON Re. 21,637

DISPLAY DEVICE

Original Filed Aug. 22, 1938

Inventor.
William S. Pearson
by Thomas H. Ferguson
Attorney

Reissued Nov. 26, 1940

Re. 21,637

UNITED STATES PATENT OFFICE 21,637

DISPLAY DEVICE

William S. Pearson, Park Ridge, Ill., assignor to Peerco, Inc., Park Ridge, Ill., a corporation of Illinois Original No. 2,150,748, dated March 14, 1939, Serial No. 226,065, August 22, 1938. Application for reissue July 17, 1940, Serial No. 346,065

12 Claims. (Cl. 40—130)

The present invention relates to display devices and has been developed with a view to displaying house numbers or other symbols before a reflecting background, capable of being illuminated at night.

The principal object of the invention is to produce an article of the kind mentioned which may be manufactured economically and which will be at the same time durable and effective in service.

The preferred embodiment of the invention is presented in the following detailed description and the accompanying drawing, while the scope of the invention is set forth in the appended claims.

Figure 1:
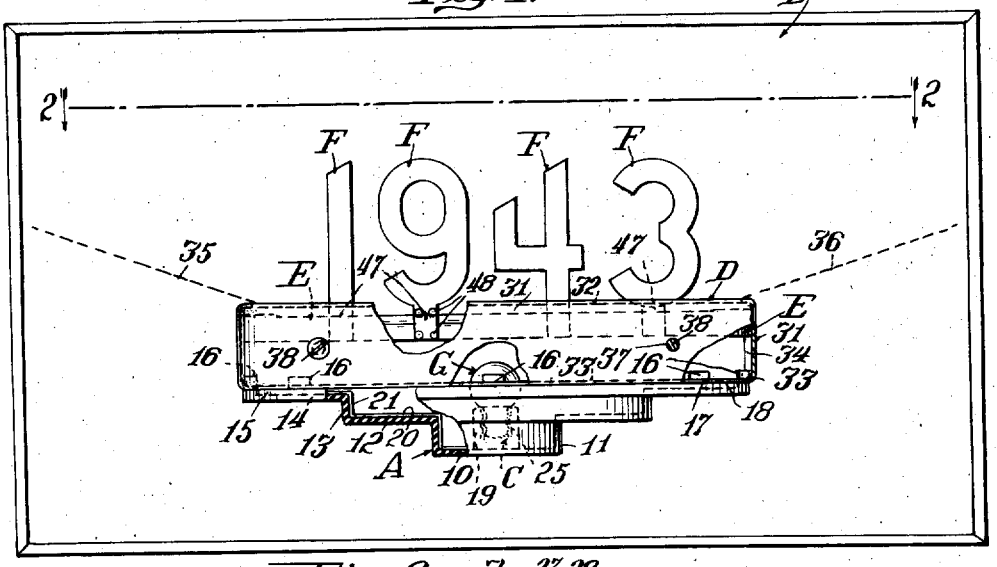
Figure 2:
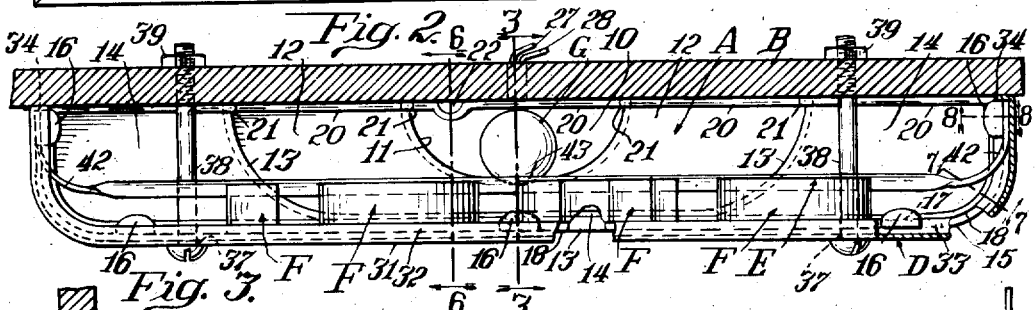
Figure 3:
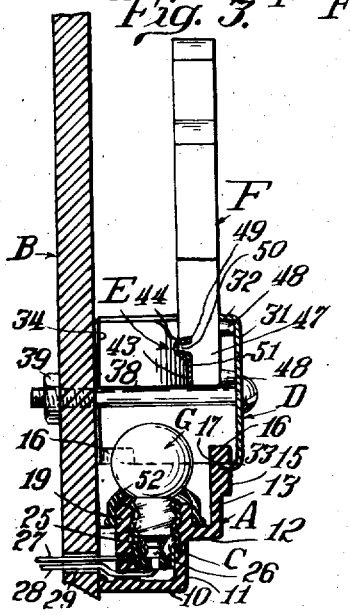
Figure 4:
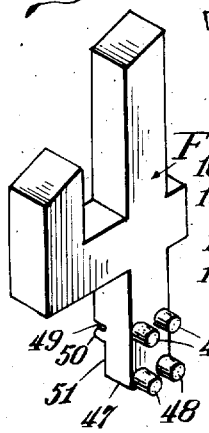
Figure 5:
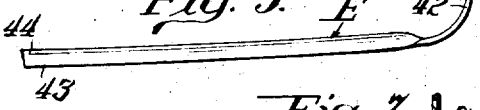
Figure 6:
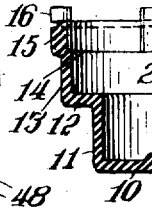
Figure 7:
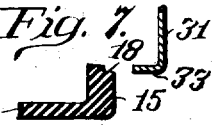
Figure 8:
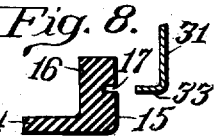

In said drawing, Fig. 1 is an elevation of the display device constructed and arranged in accordance with the present invention. Fig. 2 is a plan view of the device with the panel on which it is positioned shown in horizontal section, the position of the section being indicated by the line 2—2 of Fig. 1. Fig. 3 is a partial sectional elevation through the center of the device, the plane of section being indicated by the line 3—3 of Fig. 2. Fig. 4 is a perspective view of one of the symbols carried by the device, the same being the numeral 4. Fig. 5 is a plan view of a portion of one of the clamping strips showing its initial curvature when not in clamping position. Fig. 6 is a vertical section through the base of the device, the plane of section being indicated by the line 6—6 of Fig. 2. And Figs. 7 and 8 are detailed sectional views showing how the base and face strip fit together, the planes of section being indicated respectively by the lines 7—7 and 8—8 of Fig. 2. Throughout these views like characters refer to like parts. In some instances also parts are broken away or slightly separated to show details of construction.

The new device, as set forth in the present embodiment, includes a shelf-like base A, a support B against the face of which the base member bears, a lamp socket C located in the center of the base, an outer face plate or strip D which is secured at its lower edge to the outer upper portion of the base, a cooperating clamping strip E, one or more symbols F, in the present instance in the forms of numerals, held in place between the strips D and E, and an electric lamp G positioned in the socket C. These several parts are positioned, as clearly illustrated, so that the symbols stand out away from the face of the support and the latter serves as a reflecting surface. By making the symbols black and the surface of the support light, the symbols stand out clearly and are easily read from a considerable distance. In the daytime, the light surface of the support serves to set off the dark symbols. At night, the lighting of the lamp illuminates the surface of the support and the same result follows.

The base A comprises central, intermediate and outer portions. These are arranged in different steps or elevations, rising as one proceeds, either to the right or the left from the center, where the lamp socket is located. The central portion has a bottom 10 and an arcuate wall 11. The arrangement makes the floor 10 practically a segment of a circle. The intermediate portion has a bottom 12 associated with a wall 13. The wall has arcuate portions at its ends and a central straight portion as clearly illustrated in Fig. 2. The wall 11 of the central portion merges into the inner edge of the floor 12 of the intermediate portion, as clearly illustrated. The outer portion of the base includes a floor 14 and a wall 15. The inner edge of the floor 14 merges into and forms a continuation of the upper part of the wall 13 of the intermediate portion. The walls 13 and 14 come very close together along the central portion of the base but are separated at the ends so that the floor 14 is practically divided into two end portions with a narrow connecting strip between the two.

The upper edge of the wall 15 is provided at intervals with upright projections 16. There are five of these uprights 16. Three are spaced along the forward edge of the base, and in addition there is one at each end of the base adapted to lie adjacent to the face of the support B. Each of the projections 16 is provided with a groove 17. These grooves serve as seats for the lower flange of the face strip D. Along the top of the wall 15, at points between the uprights 16, the surface is divided into two parts, one elevated above the other so as to provide shoulders 18. These shoulders 18 are in line with the bottoms of the grooves 17. When the face strip D is in place, then its lower flange will enter the grooves 17 of all of the projections 16 and at the same time bear against the shoulders 18 formed upon the top edges of the walls 15. As clearly shown, the front edge of the base is practically parallel with the rear face and at its ends the same is neatly curved. With the construction described there is a seat provided throughout the length of the wall 15. This seat, as noted, is for the lower flange of the face strip D.

At the center of the lowermost floor 10 a cylindrical pocket 19 is provided. As we shall see later, this is for the lamp socket C. Along the open or unwalled edges of the floors 10, 12 and 14 are provided slight thicknesses in the form of beads 20. Similarly, along the edges of the vertical walls 11 and 12 there are provided similar thicknesses in the form of beads 21. Preferably the entire base A is moulded in one piece, and for the purpose Bakelite or a similar material is preferably employed. It may also be noted that at one edge of the floor 10 of the base A there is a portion 22 which is thinner than the rest of the floor 10. This is provided as a weak portion which may be broken out for the purpose of providing an opening for the passage of conducting wires on their way to the lamp socket terminals. In all installations such a passing of the wires need not be had. As we shall see presently, they may be passed through other openings. It will be seen that when the base A is placed with its open side against the face of the support B there will result a shelf-like structure with several depressions which gradually increase in depth toward the center.

The support B may take different forms. In the present instance it is illustrated as a flat slab or panel of wood or other like material against the face of which the base A is positioned. Instead of employing a separate panel B, the support B may be part of the structure on which the device is mounted. Thus, for example, if the number be placed on a residence above the door, the support B may be the lintel or other portion of the door frame. Whatever the part which constitutes the support B, its surface should have a light color so as to set off the symbols F. Thus, if the support be wood it may be painted white or given a color which will serve as a good reflector, both when the lamp G is illuminated and when the device is used in the daytime without lamp illumination.

The cylindrical pocket 19 at the center of the base A receives the socket C, which, as usual, includes a shell member 25 and a central terminal 26, suitably insulated from each other. As shown, the shell member is electrically connected to a wire 27 and the central terminal 26 is electrically connected to a wire 28. The lamp G has the usual shell and tip construction by which circuit is completed through the filament of the lamp whenever the lamp is properly positioned in the socket. The wires 27 and 28 may be passed out of the socket insulating shell 19 in different ways. As before noted, this might be by way of the opening provided by breaking out the thin portion 22 of the base floor 10. Again, it may be done as illustrated in Fig. 3 by passing each wire through an opening in the cylindrical wall of the chamber 19 and thence out through a single opening 29 in the support B. These wires are connected to any suitable source of electricity. Ordinarily the lamp G is of low voltage and the commonly supplied current is reduced to the desired voltage by a suitable transformer.

Coming now to the face strip D it will be noted that the same has an outline in plan similar to that of the forward upper edge of the base A. This strip has a central body portion 31 which terminates in an upper flange 32 and a lower flange 33. It is this lower flange 33 which is fitted into the grooves 17 and against the shoulders 18 of the base A, as before mentioned. Besides having these upper and lower flanges the strip D also has inturned flanges 34 at its opposite ends. The face strip is composed of metal and because of its curved ends has a slight yield which permits of its being easily slipped into place upon the base A. A very slight movement of the face strip D will serve to spring its end flanges 34 around the adjacent faces of the projections 16 at the ends of the wall 15 of the base A.

When the base A and the face plate D are assembled, and the structure is placed against the face of the support B, it will be obvious that with a lamp, such as the lamp G, in use, the light from the latter will be cut off at the front of the device by the strip D and a certain amount of it will be cut off at the ends of the device by the same strip. On the other hand, the light rays will be free to pass upward over the face of the support B. In this way the face of the support above the device is clearly illuminated. As the light passes out over the end portions of the structure there will be clear lines of demarcation between the upper light portion and the lower darker portion, such as indicated by the lines 35 and 36 in Fig. 1. Because of the nearness of the lamp G to the face of the support B those rays which travel upward and lie between the lines 35 and 36 will gradually lose their intensity and at some distance from the device, if the extent of the reflecting face of the support B is sufficient, there will result a change from the light surface to the more distant dark surface. This change will be gradual and there will be no distinct line of demarcation between the two, as in the case of the side lines 35 and 36. The fanlike display of light thus produced behind the dark symbols greatly augments the beauty of the device.

The face plate D is provided with a plurality of holes 37 through which retaining members 38 may be passed into engagement with the support B. In the present instance these members 38 are in the form of headed bolts which pass through openings in the base B and are threaded for the reception of nuts 39. By screwing up the nuts the assembled structure may be firmly held together. In other words, the base A and the face strip D will be held in position against the support B.

Next we come to the retaining strip E which cooperates with the strip D to clamp the symbols F in place in the device. As clearly shown in Fig. 5, the strip E has a given set so that its center bulges outward. This is provided so that when the strip is put in position in the device with symbols F in place the central portion of the strip will bear against the centrally disposed symbols with that degree of pressure which will hold the central symbols as firmly as the others. As clearly shown, the ends 42 of the strip E are arcuate and free of any transverse grooves or projections. In contrast to this, the center 43 of the strip is bent at its upper edge so as to provide a flange 44 which extends substantially at right angles to the portion 43. When assembling the strip E into the structure, the ends 42 abut at their extremities against the flanges 34 of the face strip D. As we shall see presently, the intermediate flanged portion of the strip bears against the rear sides of the symbols F. The strip E is sufficiently flexible although made of light spring metal to be slipped into place as just described after the various symbols have been set in position.

The symbols F may take various forms. Ordinarily, where house numbers are to be provided, a number of stamped up or mouled numerals are prepared and then the appropriate ones are placed in position between the strips D and E, according to the place where the device is to be used. In the present instance the house number is 1943. Each symbol is provided at its lower end with a projection 47. Upon the forward side of this projection are a number of spacing studs 48. These might be quite different in form than shown, since their only purpose is to space the top and the bottom of the projection 47 with respect to the face strip D. As shown, these projections abut against the rear of the face strip and the upper flange 32 of the face strip is engaged by the upper pair of studs 48. On the opposite side of the projections 47 is a groove 49, just above a transverse projection 50. The portion 51 below the projection 50 is cut away so as to lie in the plane of the bottom of the groove 49, all as clearly illustrated. The retaining strip E serves to engage this latter face of the projection 47, the flange 44 entering the groove 49 and the flatter portion 43 of the strip engaging the portion 51 of the projection.

It should also be noted that preferably the retaining members 38 are positioned so that when the strips D and E are assembled the upper edge of the member 38 in each instance will engage the under edge of the strip E. This fit insures pressure of the upper studs 48 against the flange 32 and thus insures a grip upon the symbols which will hold them in proper position. The two upper studs, by engaging the flange 32, hold the symbol against rocking. Rocking is also prevented by the flange 44 entering the groove 49. The engagement of the flange 44 in the groove 49 also holds the symbol up in place. While thus holding the symbols in proper elevation, the clamping strips D and E do not prevent their being shifted laterally so as to properly center them with reference to the face strip D or the device in general.

The symbols F, like the base A, are preferably moulded out of Bakelite or similar material. The result is a series of dark symbols separated from the dark base A by the face strip D which is composed of metal and is preferably bright, either by reason of the use of stainless steel or because nickel plated, chromium plated, or otherwise treated. The general effect is therefore quite attractive.

The lamp G is an electric lamp preferably of low voltage, say 6 or 8 volts, and when screwed down or otherwise operatively positioned in the socket C, is preferably protected from the weather by a ring or gasket of rubber, designated 52. This gasket is pulled down as a sleeve over the cylinder 19 of the socket structure and its upper end is closed in around the lamp G and yieldingly bears against the same, thus providing a watertight and weather-proof covering by which the lamp connections are amply protected.

It will be apparent that the device may be varied in construction in certain particulars without departing from the spirit and scope of the invention. Accordingly, it is my aim to cover such changes by the terms of the appended claims.

Thus, in respect to alterations and modifications, the number of lamps might be varied. Obviously, with a base of considerable length a plurality of lamps might in some instances be desirable. They might also be variously positioned upon the base A. Again, although I have shown the symbols F in an upright position, that is to say, with the symbols uppermost, it will be understood that the entire device might be inverted, and the symbols placed lowermost. In such event, the latter of course should have their projections 47 differently positioned upon the symbols so as to leave the latter, when mounted, in proper position for reading. In other instances, the base A and the associated parts might be mounted with the long dimension vertical and the symbols positioned at the side, again, the symbols having their projections suitably changed in position, as will be obvious. In this connection it should be pointed out that the claims are drawn so as to read upon the device when it is positioned with the symbols uppermost, as illustrated. Hence, the directional words found in the claims, such as "upper," "lower," "downward," "vertical," "below," "upright," "elevation" and the like, properly define the relation of the various parts when held in one position, although that may not be the position in which it is ultimately mounted. The functional advantages are the important ones although direction cannot in itself be wholly disregarded.

It should also be noted before concluding this description that the symbols F may be readily interchanged or replaced. This is done by disengaging one of the ends 42 of the strip E from its engaging flanges 34 on the strip D. By simply inserting the end of a screw driver behind the end 42 and bending the end by pressing against its outer side, the same may be moved free of the flange 34. When the strip E is once removed the symbols may be interchanged among themselves or removed entirely and new ones, or fewer ones, put in their stead. When the symbols are newly assembled, the strip E may be put back in place in its holding position just as before described.

I claim:

1. A display device comprising a shelf-like base adapted to bear against the face of a support which face will serve as a light reflector, an electric lamp socket positioned within said base just forward of said face, an elongated metal face strip secured at its lower edge to the upper outer edge of said base and extending upward therefrom throughout its length a distance well above said lamp socket, a second metal strip held in place behind said face strip, at least one of said strips being of springy material, said strips pressing toward each other with a clamping action, and symbols having downward projections, which projections lie clamped between said clamping strips when the parts are in assembled position, said symbols in the finished structure standing out before said reflecting face.

2. A display device comprising a substantially vertical support having a face which will serve as a light reflector, a shelf-like base bearing against said face, an electric lamp socket in the center of said base opening upward just forward of said face, an elongated metal face strip secured at its lower edge to the upper outer edge of said base and extending upward from said base throughout its length a distance well above said socket, a second metal strip of springy material held in place behind said face strip by flanges at the ends of the latter, said strips serving as clamping members for holding articles between them, symbols having downward projections passing between said strips and being clamped thereby to hold the symbols in place, and holding elements passed through openings in said face strip into said vertical support to hold the parts together, said elements passing through openings in said face strip located at a level just below the lower edge of said second metal strip, said elements thus serving to hold said second strip at a proper elevation, said symbols in the finished operating structure upstanding above said strips and outstanding before the reflecting face of said vertical support.

3. A display device comprising a substantially vertical support having a face which will serve as a light reflector, a shelf-like base bearing against said face, an electric lamp socket in the center of said base opening upward just forward of said face, an elongated metal face strip secured at its lower edge to the upper outer edge of said base and extending upward from said base throughout its length a distance well above said socket, a second metal strip of springy material held in place behind said face strip by flanges at the ends of the latter, said strips serving as clamping members for holding articles between them and having flanges extending toward each other, symbols having downward projections adapted to pass between said strips and being clamped thereby to hold the symbols in place, said projections having faces fitted to engage said approaching flanges, said faces and flanges cooperating to hold said symbols upright and against removal, and holding elements passed through openings in said face strip into said vertical support to hold the parts together, said elements passing through openings in said face strip located at a level just below the lower edge of said second metal strip, said elements thus serving to hold said second strip at a proper elevation, said symbols in the finished operating structure upstanding above said strips and outstanding before the reflecting face of said vertical support.

4. A display device comprising a shelf-like base adapted to bear against the face of a support which face will serve as a reflector of light, an electric lamp socket positioned within said base just forward of said face, an electric lamp in said socket, a sleeve of resilient material closely embracing the adjacent portions of said socket and lamp to protect the electrical connections thereof from the weather, an elongated face member secured to said base and extending before said lamp, symbols having projections for engaging said face member, and means for holding said symbols in place above said face member outward from the face of said support.

5. A display device comprising a base construction, a back member extending therefrom and a curved member bowed outwardly from the back member and attached thereto, an electric lamp socket positioned within the space between said members, and means for attaching symbols such as numerals, letters, and the like to said curved member so as to project therefrom and to be illuminated by a lamp in said socket, said means comprising an elongated resilient strip of curved configuration conforming to that of said curved member so as to resiliently embrace the same, and a symbol having a portion which extends between said curved member and said band so as to be clamped in position when said resilient band is applied to said curved member.

6. A display device comprising a base construction cooperable with a light reflecting surface at the rear thereof, said base construction being bulged and curved outwardly at the center thereof so as to provide space in which is disposed an electric lamp socket, said base construction having its ends curved toward the light reflecting surface, an elongated metal strip engaging the front portion of said base construction, and a symbol having a projecting portion which extends between said strip and said front portion, said strip being resiliently clamped to said front portion and being detachable to permit of symbols being adjustably and interchangeably clamped to the base construction.

7. In a display device of the type using an illuminated background, a symbol to be supported in front of the background, means for detachably supporting said symbol in front of and spaced from said background, said supporting means comprising a band and cooperating clamping means separated by a slight space from said band, said symbol having a projecting portion slidable in said space between said band and clamping means for adjustment relative to said background, said clamping means comprising a bowed strip secured at its ends to said background resiliently stressed toward and against said projecting portion of the symbol to hold it in said space, and lighting means positioned directly to the rear of said supporting means and arranged to cause said symbol to stand out against the background.

8. In a display device of the type using an illuminated background, a symbol to be supported in front of the background, means for detachably supporting said symbol in front of and spaced from said background, said supporting means comprising a band and cooperating clamping means separated by a slight space from said band, said symbol having a projecting portion slidable in said space between said band and clamping means for adjustment relative to said background, said clamping means comprising a strip resiliently urged toward and against said projecting portion of the symbol to hold it in said space, and lighting means positioned directly to the rear of said supporting means and arranged to cause said symbol to stand out against the background, said band having its ends curved toward said background for concealing the light at the ends of said supporting means.

9. In a display device of the type using an illuminated background, a symbol to be supported in front of the background, means for detachably supporting said symbol in front of and spaced from said background, said supporting means comprising a band and cooperating clamping means separated by a slight space from said band, said symbol having a projecting portion slidable in said space between said band and clamping means for adjustment relative to said background, said clamping means comprising a strip resiliently urged toward and against said projecting portion of the symbol to hold it in said space, and lighting means positioned directly to the rear of said supporting means and arranged to cause said symbol to stand out against the background, said band having its ends curved toward said background for concealing the light at the ends of said band, and said clamping strip being curved like said band so that said band and strip are disposed in nested relation when assembled together.

10. In a display device, a base construction cooperable with an illuminated background, an electric socket positioned in the space encompassed by the base construction for illuminating the background, an electric lamp in said socket, a sleeve of resilient material embracing the adjacent portions of said socket and lamp to protect the electrical connections thereof from the weather, an elongated member associated with said base construction in the front of said lamp, symbol means cooperable with said elongated member, and means for retainingly holding said symbol means in cooperation with said elongated member and in front of said lamp and the background.

11. In a display device, a rear member having a light reflecting surface, a symbol supporting member along and over a portion of said rear member and spaced at its central portion from said rear member and having rearwardly turned end portions attached to said rear member and closing the ends of the space between said members, means in said space and concealed from view for illuminating said surface, a symbol having a portion for connection to said supporting member, and means for attaching said symbol portion to said central portion of said supporting member inside of the space confined by said supporting member and said rear member.

12. In a display device, a rear member having a light reflecting surface, a symbol supporting member along and over a portion of said rear member and spaced at its central portion from said rear member and having rearwardly turned end portions attached to said rear member and closing the ends of the space between said members, means in said space and concealed from view for illuminating said surface, a symbol having a portion for connection to said supporting member, and means for attaching said symbol portion to said central portion of said supporting member inside of the space confined by said supporting member and said rear member, said attaching means comprising a resilient curved band disposed in resilient cooperation with the rear side of said supporting member and detachably clamping said symbol portion to said supporting member.

WILLIAM S. PEARSON.